Figure 1:
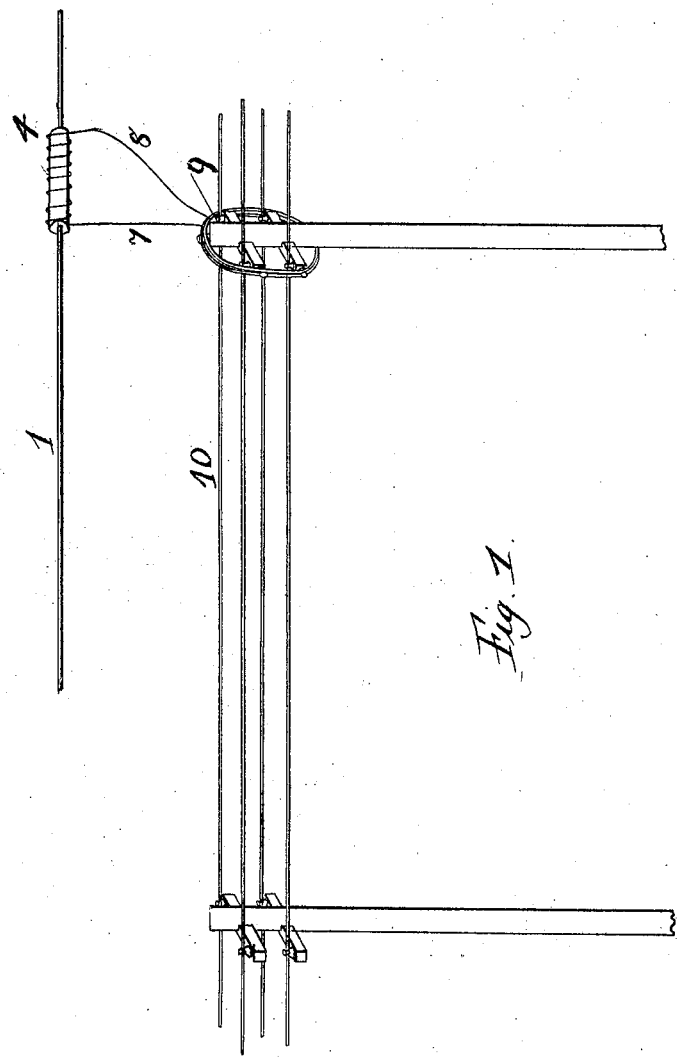

No. 838,788. PATENTED DEC. 18, 1906.
I. KITSEE.
ELECTRIC TRANSMISSION OF INTELLIGENCE.
APPLICATION FILED AUG. 11, 1906.

2 SHEETS—SHEET 1.

WITNESSES: INVENTOR

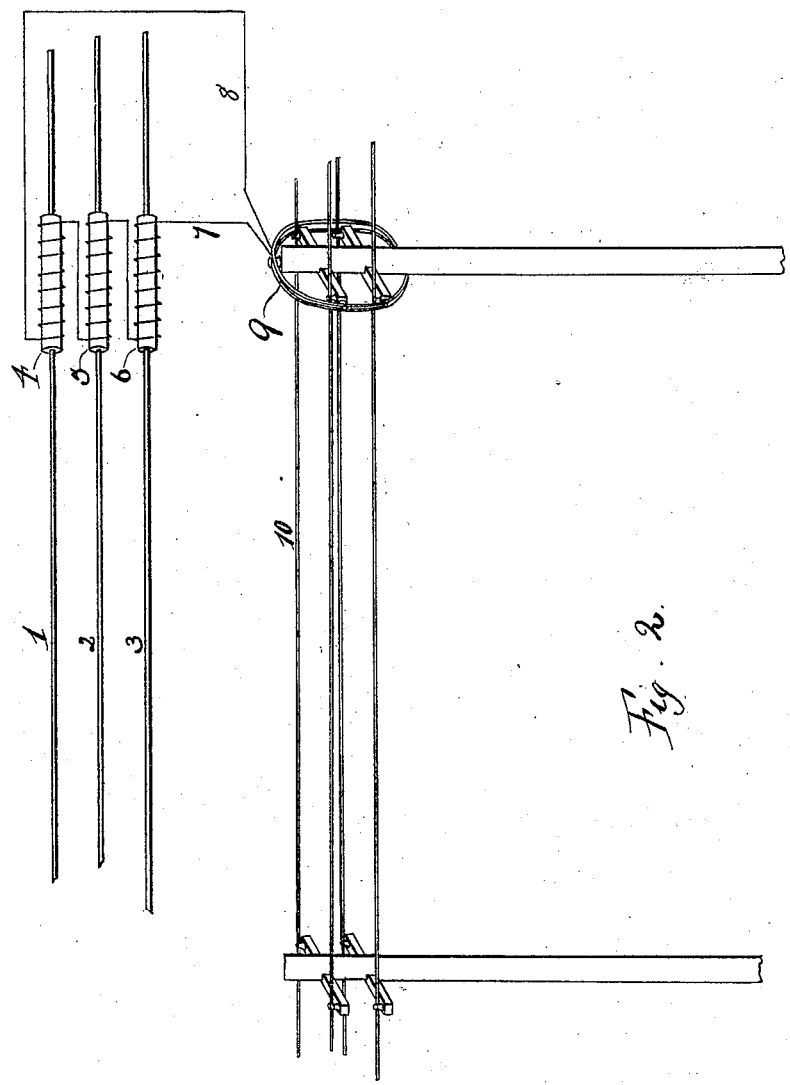

UNITED STATES PATENT OFFICE.

ISIDOR KITSEE, OF PHILADELPHIA, PENNSYLVANIA.

ELECTRIC TRANSMISSION OF INTELLIGENCE.

No. 838,788.      Specification of Letters Patent.      Patented Dec. 18, 1906.

Application filed August 11, 1906. Serial No. 330,201.

*To all whom it may concern:*

Be it known that I, ISIDOR KITSEE, a citizen of the United States, residing at Philadelphia, in the county of Philadelphia and State of Pennsylvania, have invented certain new and useful Improvements in Electric Transmission of Intelligence, of which the following is a specification.

My invention relates to an improvement in electric transmission of intelligence. Its object is to provide means to counteract or nullify the inducing effect of lines carrying a current on lines used for the transmission of intelligence.

In the drawings, Figure 1 is a perspective view of a power-line and a series of transmitting-lines embodying my invention. Fig. 2 is a similar view of a series of power-lines and a series of transmitting-lines, my invention attached thereto.

In Fig. 1, 1 is the inducing-line. 4 is a coil around said line. 10 represents the lines of transmission, and 9 is a coil of wire embracing in its inner space all the lines of transmission and here shown as supported by the support for these transmitting-lines. The coil 9 is connected, through wires 7 and 8, with the coil 4.

The operation of the device, as illustrated in the drawings, is as follows: A current adapted to induce impulses is flowing in 1, and through the varying flow of this current, or if the same is alternating through the alternations, impulses are induced in 4. At the same time impulses are also induced in each of the lines 10. If the coil 4 is now connected to the coil 9, impulses generated in 4 will flow through coil 9 and these impulses will induce impulses in the lines 10 in opposition to the impulses induced in said lines from the wire 1, thereby nullifying the effect.

In Fig. 2, 1, 2, and 3 are the power-lines. 4, 5, and 6 are the coils placed each around one of these power-lines. The coils 4, 5, and 6 are connected in series, and it is obvious that their combined impulses will flow through coil 9, thereby nullifying the inducing effect of all these power-lines on all the lines of transmission. It is obvious that the windings of the coils 4, 5, and 6 have to be in such proportion so as to nullify the effect of the induced impulses from 1, 2, and 3. It is required that such coils be put in place at different intervals throughout the whole length of the lines.

Having now described my invention, what I claim as new, and desire to secure by Letters Patent, is—

1. Means to neutralize the inducing effect of a power-wire on a series of lines of transmission, said means embracing a coil in the region of the power-wire, a coil around all the lines of transmission to be protected, the first-named coil connected to the second-named coil.

2. Means to counteract or neutralize the inducing effect of a current-carrying circuit on a series of lines of transmission, said means consisting of a coil embracing part of the current-carrying circuit and a second coil embracing part of each of the lines of transmission, both coils connected to each other.

3. Means to neutralize the inducing effect of a series of current-carrying circuits on a series of lines of transmission, said means embracing for each of said circuits one separate coil, the coils connected with each other, a circuit for said coils and also embracing one common coil for all the lines of transmission, the circuit of the first-named coils connected to said last-named coil.

4. Means to counteract the inducing effect of a power-wire on lines of transmission, said means comprising for said power-wire a coil and comprising a second coil embracing in its inner space more than one line of transmission, both of said coils in operative relation as to each other.

In testimony whereof I affix my signature in presence of two witnesses.

ISIDOR KITSEE.

Witnesses:
     MARY C. SMITH,
     ALVAH RITTENHOUSE.